May 19, 1931. P. ARBEIT 1,805,796
MACHINE FOR MAKING GLASSWARE
Filed April 24, 1925 5 Sheets-Sheet 4

Inventor
Pierre Arbeit
By Robert D. Brown
Attorney

May 19, 1931.    P. ARBEIT    1,805,796
MACHINE FOR MAKING GLASSWARE
Filed April 24, 1925    5 Sheets-Sheet 5
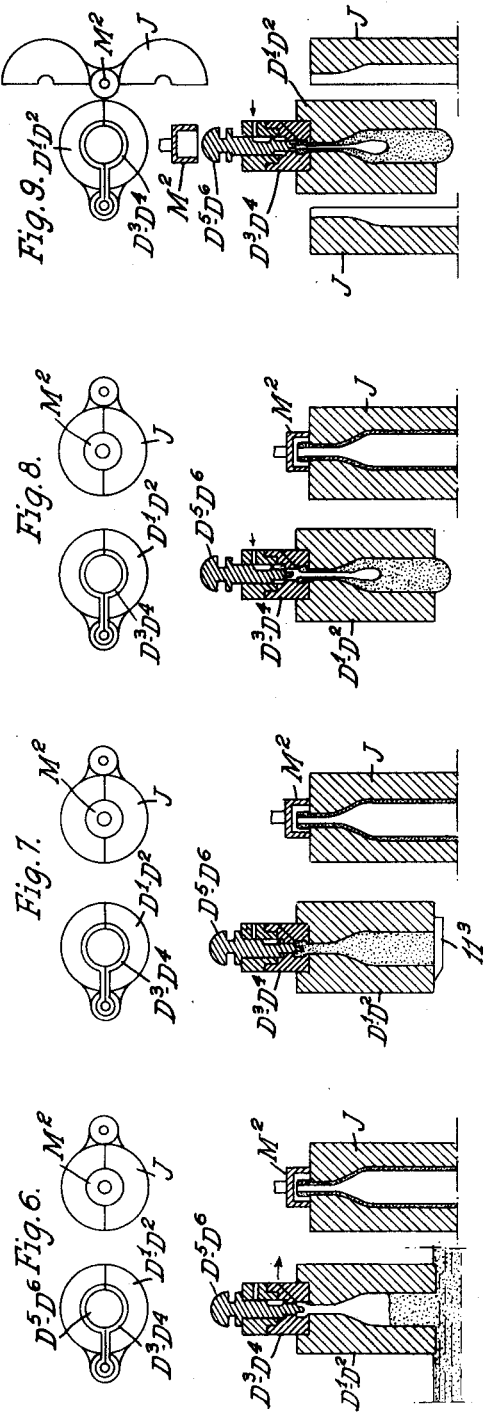
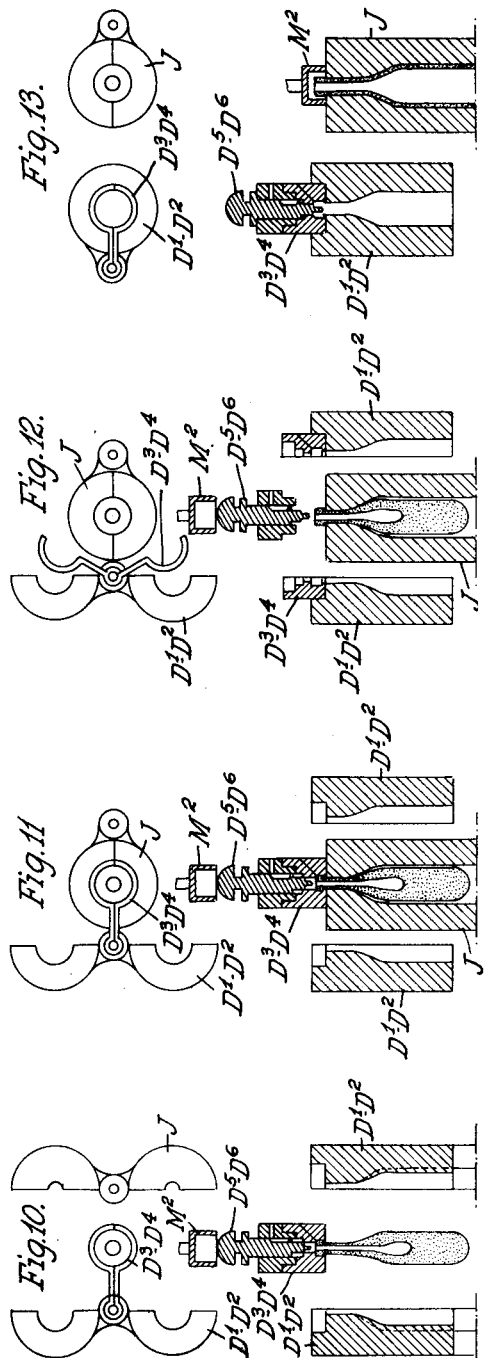
Inventor:
Pierre Arbeit Patented May 19, 1931

1,805,796

UNITED STATES PATENT OFFICE

PIERRE ARBEIT, OF PARIS, FRANCE, ASSIGNOR TO HARTFORD-EMPIRE COMPANY, OF HARTFORD, CONNECTICUT, A CORPORATION OF DELAWARE

MACHINE FOR MAKING GLASSWARE

Application filed April 24, 1925, Serial No. 25,574, and in France May 1, 1924.

The present invention has for its object a suction-fed machine for automatically manufacturing bottles, flasks, jars, carboys and similar glass articles.

At present, this manufacture is carried out by means of machines operating through very complicated mechanisms, the movements of which are not regular because of the presence of cams, levers, and other parts which set up too many irregularities of motion. Moreover, the construction of the machine makes the cost of production, as well as the cost of maintenance, too high. Also, the gathering operations being always repeated in the same place in the furnace, the glass chills and after a certain time the machine ceases to operate properly.

An object of the machine of the present invention is to remedy these defects. It is characterized by the fact that the different parts or mechanical appliances, for the automatic manufacture of bottles and similar glass articles, are controlled by fluid pressure. The motive fluid used for this purpose may be compressed air or other gas, or even a liquid.

According to the present invention, the different parts of the machine may be operated automatically from a central distributor in the desired order. This central distributor is preferably self-acting through the operation of the machine, by means of a fluid-pressure connection.

A further object of the present invention is to provide a novel suction gathering machine for forming hollow glassware wherein a blank mold unit is moved between a charge gathering station and a blank transfer station, and in which certain of the operations of the machine may be controlled in response to the movement of the unit toward and away from the gathering station. For example, such movement of the blank mold unit may control the application of vacuum to the molds while the unit is at the gathering station; the formation of the blanks in said unit for the transferring of the blank to a finishing mold at the transfer station. The mechanism and means for forming the blank in the finishing mold into a completed article also may be controlled in response to the movement of the blank mold unit. Such control of certain of the parts of the machine insures more perfect synchronism of the operation.

The annexed drawings show, but only by way of example, an embodiment of a bottle-making machine in an installation comprising two sets of molds working in parallel and at the same time, and controlled by the same mechanical and pneumatic parts.

In the accompanying drawings:—

Figures 6 to 13 are diagrammatic views, in plan and in axial vertical section, showing the different successive positions of the molds during the different stages of the fabrication of the bottles.

Figure 1:
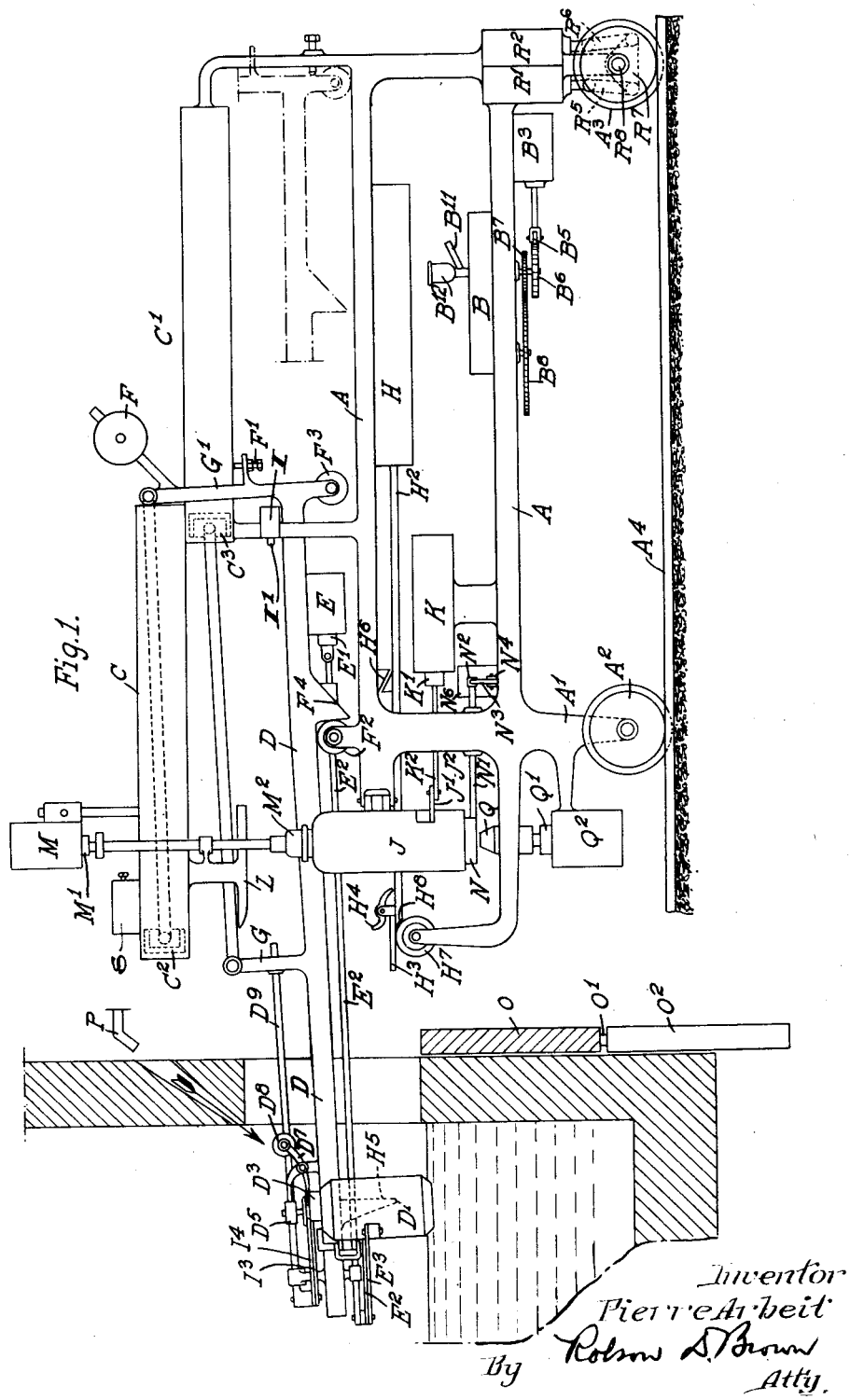
Figure 1 is an elevational view.

On a frame A of suitable form, supported by feet $A^1$ and mounted on pairs of wheels $A^2$ and $A^3$, is placed a distributor which governs the different controls of the machine, by distributing compressed air to the different parts. This distributor consists essentially of a box B enclosing two disks $B^1$ and $B^2$. A cylinder $B^3$ actuates a piston $B^4$ operating a ratchet $B^5$ which drives a ratchet wheel $B^6$ fastened on the axle of the disk $B^1$. This ratchet wheel carries a number of teeth corresponding to the number of positions into which must be brought the distributor disk $B^1$ for controlling the different movements of the machine, for example ten positions, as will be explained in detail later. The second disk $B^2$ is driven at a slower speed, by means of spur gears $B^7$, $B^8$. A disk $B^9$, fastened on the same axle as the distributor disk $B^1$ and the ratchet wheel $B^6$, carries on its periphery ten notches into which engages a spring-pressed pin $B^{10}$ (Fig. 2) in such a way as to position the distributor disks after each movement produced by the operation of the ratchet wheel $B^6$ by the ratchet $B^5$.

The operation of the ratchet is effected by fluid flowing through the pipes numbered from 1 to 10 on the drawings and terminating (see particularly Figures 4 and 5) in conduits formed in the bottom of the box B of the distributor. These conduits are placed at equal distances from each other, that is to say, at an angular displacement of 36 degrees from each other, following a circle having for its center the axis of the distributor disk $B^1$.

The pipes numbered from 11 to 22 inclusive are the pipes for the distribution of compressed air to actuate the different parts and mechanical arrangements of the machine. The pipes 11 to 20 inclusive terminate in the bottom of the box B of the distributor and are connected to conduits disposed upon a radius having as its center the axis of the distributor disk $B^1$. The pipes 21 and 22 terminate in the bottom of the box B under the distributor disk $B^2$ and are connected to conduits disposed on a radius having for its center the axis of this disk $B^2$.

At the side of each conduit which is formed in the bottom of the box B of the distributor, is formed a parallel conduit opening to the outer air and serving to exhaust the corresponding pipe (11 to 20). It is to be noted, however, that the conduit corresponding to the pipe 20 does not open to the atmosphere but is connected to the vacuum-producing mechanism, which is not shown on the drawings, but which will be explained later.

Within the body of the distributor disk $B^1$, and starting from its lower surface, are discontinuous grooves $b$, which are concentric around the axis of the disk $B^1$ as a center. These grooves comprise portions extended through different sectors of the disk $B^1$ and which are intended, in consequence of the rotation of the distributor disk $B^1$ under the influence of the ratchet $B^5$ on the ratchet wheel $B^6$, to place themselves at various predetermined times opposite the several conduits corresponding to the pipes 11 to 20 inclusive.

Considering one of the said circular and discontinuous grooves $b$, it is evident that certain parts of this groove are wider than others. The wider parts of the grooves are each meant to register simultaneously, on the upper surface of the bottom of the box B, with one of the conduits formed in the bottom of the box and terminating at one of pipes 11 to 20, as well as the conduit adjacent to the first-mentioned conduit and leading to the outer air, in such a way as to exhaust the pressure from the said pipe. On the other hand, the narrower parts of the circular discontinuous grooves register only with the conduits in the bottom of box B which are connected to the pipes 11 to 20. Each of these narrower parts of the grooves $b$ communicates through a conduit $b^1$, formed in the distributor disks $B^1$ and in the notched locking disk $B^9$, with the inside of the box B above the distributor disk. In the cover of this box B, at $B^{11}$, is an inlet for compressed air or other fluid under pressure, which, in passing under an oil cup $B^{12}$ charges itself with oil and passes into the box B. Through the conduits $b^1$ and through the narrow parts of the circular discontinuous grooves $b$ which are situated at that time opposite the conduits in the bottom of box B, this pressure fluid is admitted into the pipes 11 to 20 and proceeds to actuate the corresponding mechanisms, as will be explained later.

Likewise, two circular discontinuous grooves $b^2$ are formed in the lower face of the distributor disk $B^2$. Each of these grooves includes two disconnected parts, one wide and the other narrow; the wide part is intended to exhaust the pipe 21 or 22, by simultaneously registering with the conduit formed in the bottom of the box B and terminating in the pipe 21 or 22, as well as the conduit which is parallel to the first, and which opens to the air. On the other hand, the narrow parts of these grooves $b^2$ communicate with the inside of the box B through the conduits $b^3$, pierced through the distributor disk $B^2$ and serving to admit pressure fluid into the conduits connected to the pipes 21 or 22 as the case may be.

Figure 4:
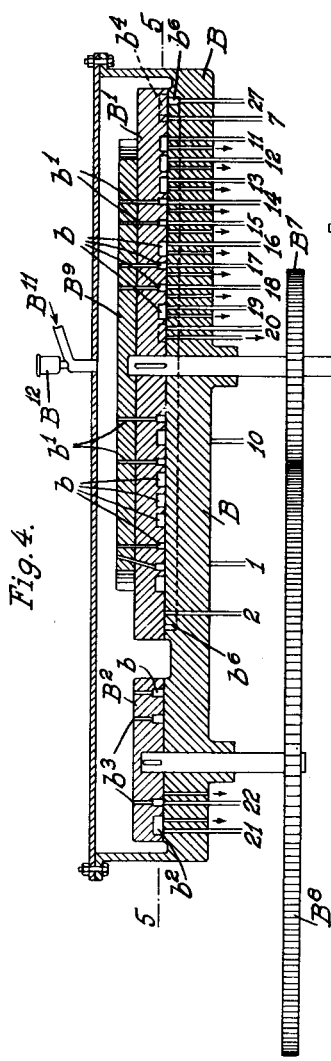
Figure 4 is an axial vertical sectional view, on an enlarged scale, through the central distributor controlling the different movements.
Figure 5:
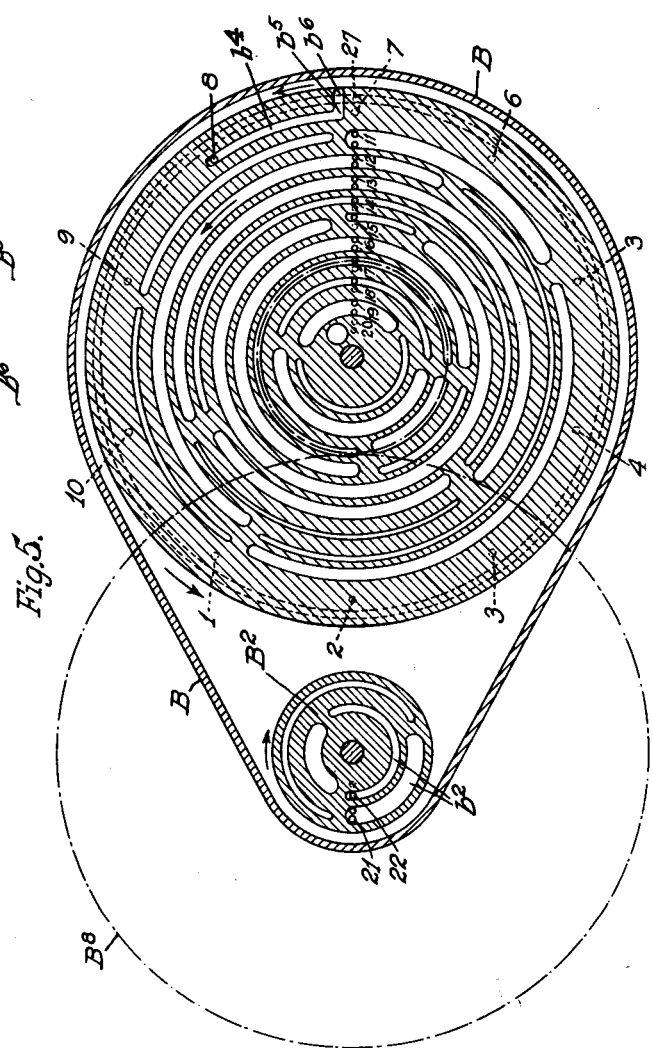
Figure 5 is a horizontal sectional view on the line 5—5 of Figure 4.

Thus, in the position of the distributor shown in Figures 4 and 5, the pipe 21 is an exhaust pipe, pipe 22 an intake pipe, pipes 20, 19, 16, 13, 12 and 11 are exhaust pipes and pipes 18, 17, 15 and 14 are intake pipes.

The distributor disk $B^1$, moreover, has in its lower surface resting on the bottom of the box B, a circularly curved groove $b^4$ (Figure 5) ending in an outwardly extending radial portion $b^5$ which may cover at the same time one of the conduits formed in the bottom of the box B and connected to the pipes 1 to 10, and also a continuous circular groove $b^6$ formed in the upper face of the bottom of the box B. This continuous circular groove $b^6$ is connected, by means of a conduit pierced through the bottom of the box B, to a pipe 27 which supplies compressed air to the cylinder $B^3$, the piston $B^4$ of which operates the ratchet $B^5$ which drives the ratchet wheel of the distributor $B^1$.

In the position shown in Figs. 4 and 5, the distributor disk $B^1$, turning in the direction of the arrow, has just interrupted the communication, through the grooves $b^4$, $b^5$, $b^6$, between the conduits leading respectively to the pipes 7 and 27. It has just placed itself in the position which establishes communication between the pipes 8 and 27. During a rotary movement of one-tenth of a turn, that is, of 36 degrees, under the action of the ratchet $B^5$ and the ratchet wheel $B^6$, there will be no change for pipes 11, 13, 14, 16, 17, 18 and 19, because those parts of the grooves $b$ of the disk $B^1$ which are opposite to these pipes, extend over more than 36 degrees. On the other hand, the distribution will be reversed through the pipes 12 and 15.

It is to be noted that certain parts of the circular discontinuous grooves $b$ of the distributor disk $B^1$, serving for the intake or the exhaust, can present different transverse sections in such a way as to regulate at will the flow of compressed air, according to the required speed of movement of the mechanism controlled by that part of the groove.

It may be noted also that the construction of the distributor, as described and shown, assures air-tightness of the apparatus, the distributor disks $B^1$ and $B^2$ being always pressed against the smooth bottom of the box B through the pressure of the compressed air admitted at $B^{11}$ through the cover of the box B.

Figure 3:
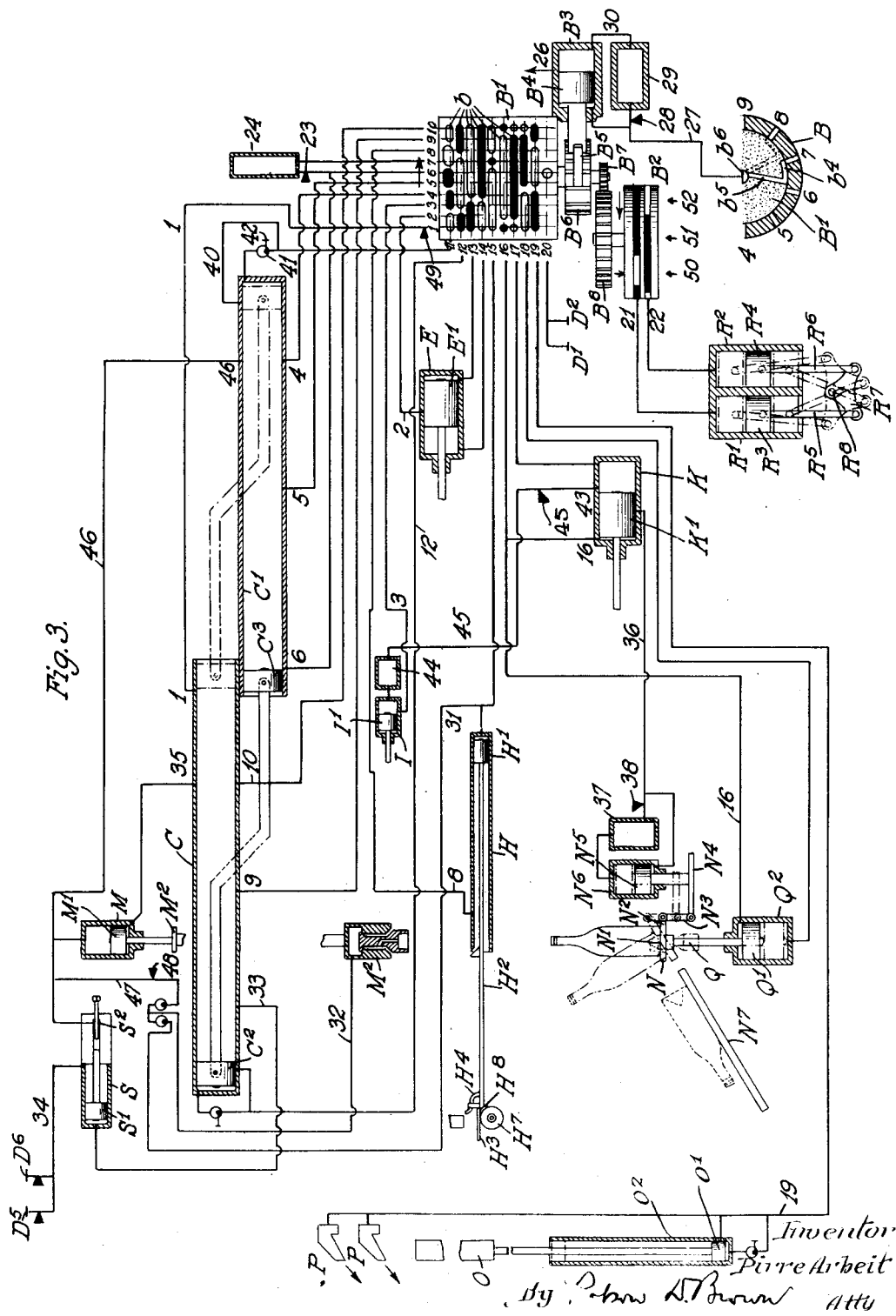
Figure 3 is a diagrammatic view showing more particularly the fluid-pressure control arrangements and the pipes connecting these parts to the mechanical arrangements.

In Fig. 3 the distributor is shown diagrammatically by the development in one plane of the circular discontinuous grooves $b$, of the distributor disk $B^1$. The parts of these grooves supplying pressure in the pipes 11 to 20 are represented by the dark areas, while the parts of the grooves that exhaust the same pipes are represented by the light areas, following the same horizontal line opposite to the corresponding pipes 11 to 20. For any given position of the distributor disk $B^1$, it is sufficient to consider the different parts of the grooves situated on a single vertical line opposite one of the pipes 1 to 10, to know which of the pipes 11 to 20 are exhausting and which are admitting pressure. Taking the vertical line opposite the pipe 7, (the position 7 of the distributor) it is seen that the pipes 11, 12, 13, 16 and 19 are exhausting, and the pipes 14, 15, 17 and 18 are admitting pressure. It is likewise seen that when the distributor passes from the position 7 to the next position, which is the position 8, there will be a change of distribution in the pipes 12 and 15. The pipe 12, which was exhausting, becomes an intake pipe, while the pipe 15, which was admitting pressure, is caused to exhaust.

The machine comprises the following mechanisms (Figs. 1 and 2):

Two cylinders C and $C^1$, carried by the frame A, operate two pistons $C^2$ and $C^3$ respectively, which actuate a movable slide D that supports at its forward end two blank molds $D^1$ and $D^2$, two ring molds $D^3$ and $D^4$, two plungers $D^5$ and $D^6$, and two plunger-operating levers $D^7$.

The slide D carries, near its rear end, a cylinder E having a piston $E^1$ which, by means of connections $E^2$ and $E^3$, controls the opening and closing of the blank molds $D^1$ and $D^2$. Behind the center of gravity of the slide D is disposed a counterweight F which allows the slide to be suitably balanced, in accordance with the weight of the blank molds. At the end of the slide D opposite the blank molds is an adjusting screw $F^1$, which bears against the cylinder $C^1$ and allows the slide D, and the blank molds carried thereby, to follow the level of the glass in the furnace if this level does not remain constant. The slide is supported by rollers $F^2$ and $F^3$. When it comes to the end of its forward stroke, in its glass-gathering movement, it is stopped by the engagement of a projection $F^4$ of the slide with the roller $F^2$ carried by the frame A. It then swings about this roller $F^2$ as a pivot, and the blank molds dip into the glass bath.

Connecting members G, $G^1$ connected to the pistons $C^2$, $C^3$ of the cylinders C, $C^1$, produce the longitudinal reciprocations of the slide D and, consequently, the reciprocations of the blank molds.

The frame A supports a cylinder H actuating a piston $H^1$, which is connected by a rod $H^2$ to shears $H^3$ which serve to cut the glass under the blank molds. On this rod $H^2$ is mounted a ratchet $H^4$ which, after the severing operation, strikes against a member $H^5$ which is secured between the blank molds. When the blank molds move to the rear, they draw with them the shears $H^3$ by means of this member $H^5$. A cam member $H^6$ secured on the frame A, then depresses rod $H^2$ and the ratchet $H^4$ carried thereby. The roller $H^7$, on which rides the rod $H^2$ carrying the shears $H^3$, is then able to engage beneath a beveled portion $H^8$ of this rod, so that the shears $H^3$ drop slightly and cease to be dragged by the member $H^5$ during the movement of the blank molds; when the latter reverse their movement, that is, move forward for the next gathering operation, they will pass over the ratchet $H^4$, without moving it and without moving the shears $H^3$.

Connected to the pivotally mounted sections of the neck molds are links $I^3$ and $I^4$ which in turn are pivotally connected to the outer ends of laterally extending branches $I^2$ of the T-shaped actuating rod $D^9$. The rod $D^9$ is slidably mounted for longitudinal movement in brackets formed on the slide D, as shown (Fig. 1). The movement of the slide D away from the gathering station carries the outer end of rod $D^9$ toward, and into, a position to be operated by a piston $I^1$ in the cylinder I. This cylinder is carried by the frame A. At appropriate times, fluid pressure is admitted into the cylinder I to actuate the piston $I^1$ to open the neck molds. Suitable means may be provided for closing the neck molds, such as springs or the like.

The finishing molds J, J are operated by connecting members $J^1$, $J^2$ that are pivotally secured to a cross piece $K^2$ connected to the piston $K^1$ of a cylinder K. The operating levers $D^7$ of the plungers $D^5$, $D^6$ are actuated by two fixed cam members L, L, by means of rollers $D^8$ carried by these levers, and engaging these cam members at the desired time.

Figure 2:
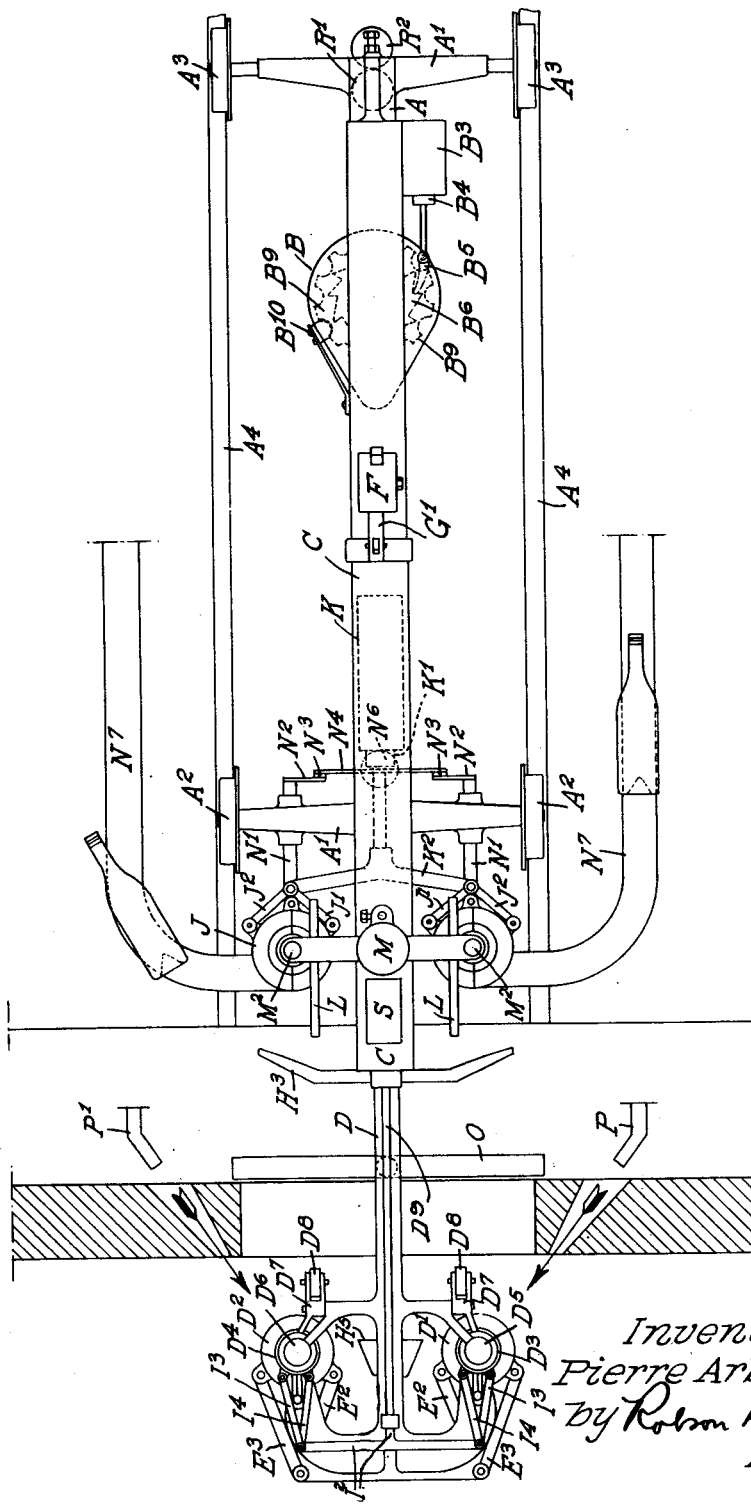
Figure 2 is a plan view showing the different parts and appliances during the gathering operation.

A cylinder M actuates a vertical piston $M^1$ carrying two blow heads $M^2$, which make contact with the finishing molds J. Under the finishing molds are disposed movable bottom members N, each of which is adapted to turn around a stationary longitudinal pivot $N^1$ that is journaled in the feet $A^1$ of the frame A. On each pivot $N^1$ is secured a transverse lever $N^2$, joined by a connecting rod $N^3$ to a transverse member $N^4$ which is integral with the piston $N^5$ of a vertical cylinder $N^6$ common to the two movable bottom members N. On Fig. 3 the assembly of this device is, for clearness in the drawings, shown displaced at 90° from its real position, as indicated in Figs. 1 and 2. An upward movement of the piston $N^5$ in the cylinder $N^6$ causes the two movable bottom members N to tilt simultaneously, each turning outwardly around the pivot $N^1$, so as to deposit the bottles supported by these bottom members N upon inclined wooden chutes $N^7$ along which they slide.

The furnace is closed by a door O which is lifted automatically, when desired, by a piston $O^1$ actuated by cylinder $O^2$. It descends by its own weight when pressure has ceased under the piston $O^1$. Two burners P and $P^1$ are automatically lighted when the door O is closed. These burners reheat the place where the glass is gathered, and are automatically put out when the door O opens. The operation of the burners through the movements of the door is not shown on the drawings. It may be produced in any suitable manner.

An arrangement for "pushing up" the bottoms of the bottles, which may be used as desired, is produced by providing the bottoms N of the molds with center holes to admit "pushing up" tools Q, which are carried by the rod of a piston $Q^1$ and are actuated by a cylinder $Q^2$.

As is indicated in my copending application for Letters Patent filed of even date herewith, Serial No. 25,573, the places where the glass is gathered in the furnace is preferably changed by displacing the machine with respect to the furnace after each gathering operation, in such a way that the gathering operations take place at different points. This result is obtained, in the present machine, by the following mechanism (see Figs. 1 and 3). Two cylinders $R^1$, $R^2$ actuate, through pistons $R^3$, $R^4$ and connecting rods $R^5$, $R^6$, a rocking member $R^7$ of triangular form, the pivotal axis $R^8$ of which is provided by the axle of the wheels $A^3$. The movement of the pistons $R^3$, $R^4$ turns the wheels $A^3$ in one direction or the other, thus moving the machine forward or back longitudinally. To produce a transverse displacement of the machine, so as to change the gathering points transversely, a similar arrangement (not shown) may be employed. Such an arrangement may consist, for example, of a carriage supporting the longitudinal rails $A^4$ (Fig. 1) on which the machine directly runs, this carriage being itself carried by four wheels running upon rails disposed at 90° with respect to the rails $A^4$, and two of these wheels, mounted on the same axle, being actuated by a mechanism similar to that which actuates the wheels $A^3$.

A cylinder S actuates a piston $S^1$ (see Fig. 3) which operates to supply the initial blowing air through or past the plungers $D^5$, $D^6$. The throw of this piston $S^1$ is regulated, by means of a threaded rod $S^2$, in such a way as to supply, as will be later described in detail, the exact amount of air necessary for the piercing or counterblowing of the parison.

As has been stated above, the machine as shown, comprises two series of molds, working in parallel and at the same time, and operated by the same fluid-pressure and mechanical parts. To simplify the explanation of the operation of the machine, only one series of parts will be considered hereafter, the other operating in exactly the same way. The invention may obviously be applied to a machine having only a single series of molds, or having a number greater than two.

It is only during the operation of transferring the parison that the blank molds work with the finishing molds. At all other times, they work separately, one from the other, to avoid loss of time.

The operation of the machine is described below, with reference to Figs. 3 and 6 to 13.

The air arriving through the valve 23 fills the reservoir 24, passes through the pipe 7 and through the grooves $b^4$, $b^5$, $b^6$ of the distributor, and arrives through the pipe 27 directly in front of the piston $B^4$ which it moves from left to right, thus retracting the ratchet $B^5$. During this operation, the air passes slowly through the valve 28 and fills the reservoir 29. When the pressure in this reservoir is sufficiently great, the air passes through the pipe 30 and moves the piston $B^4$ from right to left. The section of the piston on which the air from the pipe 30 acts is greater than that on which the air pressure from the pipe 27 is exerted. This displacement of the piston $B^4$ toward the left results in advancing the ratchet $B^5$, which acts on the ratchet wheel $B^6$ and advances it one tooth, thus turning the distributor disk one-tenth of a revolution. The distributor disk $B^1$ is held in this position by the spring-pressed pin $B^{10}$, which, engaging in the corresponding notch $B^9$ of the disk, assists the ratchet in communicating to the ratchet wheel the exactly correct amplitude of rotation, in case that the ratchet does not suffice to produce the necessary movement. When the piston B⁴ arrives at the end of its movement to the left, the groove b⁴, b⁵ of the distributor disk B¹, has ceased to communicate with the pipe 7, and the compressed air ceases to act upon the piston B⁴. This piston uncovers an exhaust port 26 provided in the cylinder B³ and the air which has just been active escapes. The distributor disk has been brought, through its rotation of 36°, into the next position (position 7), which is the position shown in Figs. 4 and 5. As may be understood by the diagrammatic showing of the distributor in Fig. 3, and also by examination of Fig. 5, a change in air distribution is produced for pipes 11, 15, and 20. The pipe 11 which was an intake pipe is now an exhaust pipe. The pipe 15 which was exhausting is now an intake pipe. The pipe 20 which communicated with the vacuum-producing apparatus, is now disconnected from it. This pipe 20 is connected (Fig. 3) to the blank molds D¹, D², and consequently the suction within the blank molds ceases. The air in the cylinder C¹ can escape through the pipe 11 which is now open to exhaust. Thus, the blank molds D¹, D², carried by the slide D, are caused to rise under the action of the counterweight F. This escape of air takes place through the pipe 40 without requiring the air to pass through the regulator 41, which is composed of a ball-valve with a regulating screw 42, and which is mounted on the pipe 11. It is to be noted that such regulators or valves are provided at all suitable points in the piping system, to make the movements slow or rapid as needed, or to stop them without shock. Moreover, the exhaust streams of air are directed on the molds to cool them. This arrangement is not shown in the drawings.

The compressed air, admitted through the pipe 15, produces two operations. First, it enters the cylinder H and pushes forward the piston H¹ which sends before it the shears H³. This movement results in cutting the glass under the blank mold D¹, as shown in Fig. 7. Second, the air passes through the pipes 31 and 32, and thence into the blow head M² and blows the bottle in the finishing mold J.

When the piston H¹ reaches the end of its movement to the left, it uncovers an outlet port, and the air passes through the pipe 8, and actuates the distributor B¹, which it causes to advance one-tenth of a revolution in the same way as has been described above. The distributor, brought into the position 8, produces a change in air distribution in the pipes 12 and 15.

Pipe 15 is exhausted, and the blowing which has taken place in the finishing mold, through the pipes 15, 31, 32 and the blow head M², is stopped. The bottle is finished. The compressed air admitted through the pipe 12, sends the pistons C², C³ to the right. The air behind the piston C³ escapes rapidly through the pipe 11, which is wide open to exhaust at this position 8 of the distributor. The displacement of the pistons C², C³ to the right, cause the blank molds to emerge from the furnace. The member H⁵, situated between the blank molds, draws back the ratchet H⁴ which, in turn, draws back the shears and the piston H¹ of the cylinder H. During this operation, the shears H³ remain under the blank molds to prevent the glass from falling, as shown in Fig. 7.

When the piston C² passes the port of the pipe 33, the compressed air passes through this pipe 33 into the cylinder S and pushes the piston S¹ of this cylinder to the right. The air behind this piston S¹ is compressed and, through the pipe 34, penetrates through the plunger D⁵, D⁶ which have been raised by the engagement of their rollers D⁸ with the cams L. The compressed air admitted into the plungers D⁵, D⁶ blows an initial opening in the parisons, as shown in Fig. 8.

The piston C², continuing its movement to the right, uncovers the pipe 9 through which the air passes and actuates the distributor disk B¹, turning this disk one-tenth of a revolution to bring it into the position 9. It thereby produces a change in air distribution in the pipes 11 and 19.

The exhaust through pipe 11 is slackened, the part of the discontinuous circular groove corresponding to this pipe in the distributor disk being of smaller section. This arrangement is intended to slow down the pistons C², C³ in their course. The air admitted into the pipe 19, flows under the piston O¹ of the cylinder O², which has the effect of raising and closing the door O on the furnace behind the blank molds which have just come out of the furnace.

At the same time, the air blows into the burners P which are put into action and reheat the place in the furnace where the gathering has just taken place.

The piston C², continuing its course to the right, uncovers two ports. The air entering through the port into the pipe 35, raises the blow head M² of the finishing mold J, by exerting pressure under the piston M¹ of the cylinder M. The air penetrating through the other port into the pipe 10, actuates the distributor disk B¹, which it turns through one-tenth of a revolution, bringing the disk to the position 10. This produces a change of air distribution in the pipes 16, 17 and 18.

The pipes 17 and 18 being connected to exhaust, the air can escape to the right of, and behind, the piston K¹ of the cylinder K which operates the finishing molds J, and under the piston Q¹ of the cylinder Q². The air admitted through the pipe 16, causes the piston Q¹ of this cylinder Q² to descend, thus engaging the "pushing up" tool from the bottom of the mold. At the same time, the compressed air pushes the piston $K^1$ to the right in the cylinder K. This operation results in opening the finishing molds J, as shown in Fig. 9. When the piston $K^1$ arrives at the end of its course to the right, it allows the compressed air, admitted through the pipe 16, to pass into the pipe 36. This air first goes directly to raise piston $N^5$ of the cylinder $N^6$, which results in tipping the movable bottom N of the finishing mold, causing it to turn about its pivot $N^1$ and to deposit on the chute $N^x$ the bottle which has just been finished. At the same time, the air coming through the pipe 36 fills the reservoir 37, more or less quickly, according to the degree of opening of the valve 38. When the reservoir 37 is at the same pressure as that prevailing under the piston $N^5$, the latter descends again and the movable bottom N of the finishing mold resumes horizontal position.

As the piston $C^2$ continues to push ahead of it the piston $C^3$, the latter closes the port connected to the pipe 40. Since the air is now able to escape only through the ball-regulator 41, the movement of the pistons $C^2$ and $C^3$ is slackened more or less, according to the adjusted position of the screw 42 which more or less prevents the ball from resting on its seat. The shock which might be produced when the pistons $C^2$, $C^3$ are stopped is thereby checked.

When the piston $C^2$ arrives at the end of its course, it uncovers a port connected to the pipe 1. This admits air which actuates the distributor disk $B^1$, turning it one-tenth of a revolution, and brings it into the position 1, thereby causing a change of air distribution in the pipes 13 and 14. At the same time, the piston $I^1$ of the cylinder I which actuates the ring molds, is pushed to the end of its rearward course to the right, through the rod $D^9$.

The air in front, that is to say, to the left, of the piston $E^1$ of the cylinder E, can escape through the pipe 14. The air admitted through the pipe 13 pushes the piston $E^1$ ahead, that is, toward the left, which produces the opening of the blank molds $D^1$, $D^2$, as shown in Fig. 10. When the piston $E^1$ arrives at the end of its course to the left, it uncovers a port connected to the pipe 2, through which passes the air admitted by the pipe 13. This actuates the distributor disk $B^1$, which is brought into the position 2 for which position there is produced a change in air distribution in the pipes 16 and 17.

The air contained in the cylinder $Q^2$, above the piston $Q^1$, can escape through the pipe 16. The air admitted by the pipe 17 pushes ahead, that is, to the left, the piston $K^1$ in the cylinder K. This movement closes the finishing mold J upon the parison, as shown in Fig. 11.

When the piston $K^1$ arrives at the end of its course to the left, it uncovers a port connected by the pipe 43 to a reservoir 44, which the air fills more or less quickly, according to the degree of opening of the valve 45 inserted in the tube 43. The air filling the reservoir 44 acts upon the piston $I^1$ of the cylinder I, which actuates the ring molds $D^3$, $D^4$. This piston $I^1$, thus displaced to the left, opens the ring mold (as shown in Fig. 12) shortly after the finishing mold J has closed upon the parison.

When piston $I^1$ reaches the end of its course to the left, it uncovers a port attached to the pipe 3 through which the air, coming from the reservoir 44, actuates the distributor disk $B^1$, which it brings to the position 3, making it turn one-tenth of a revolution. For this position 3, a change in air distribution is produced in the pipes 11 and 12. Through pipe 12, the air can escape from the cylinder C at a regulated speed. The air, admitted in small quantity through the pipe 11 into cylinder $C^1$ at the right of piston $C^3$, causes the displacement of the piston $C^3$ to the left, taking with it the piston $C^2$. The object of this movement is to advance the blank mold slowly toward the furnace.

When the piston $C^3$ uncovers the port of the pipe 46, the air admitted into this pipe causes the piston $M^1$ of the cylinder M to descend, which lowers the blow head $M^2$ upon the finishing mold J. This air also pushes to the left the piston $S^1$ of the cylinder S, which brings it back to its original position. Through the pipe 47, the valve 48 and the pipe 32, the air acts on the blow head $M^2$ and blows the bottle gently in the finishing mold, as shown in Fig. 13.

When the piston $C^3$, in moving to the left, uncovers the port of the pipe 4, air is admitted into this pipe 4 and causes the distributor disk $B^1$ to turn through one-tenth of a revolution, and brings it into the position 4. For this position there is produced a change in air distribution in the pipes 13 and 14.

Through the pipe 13 the air can escape from behind the piston $E^1$ of the cylinder E. The air, admitted through the pipe 14, pushes the piston $E^1$ back, that is, to the right. This displacement of the piston $E^1$ closes the blank mold $D^1$, $D^2$ as shown in Fig. 13.

When the piston $C^3$, in moving to the left, uncovers the port of the pipe 5, air admitted into this pipe 5 brings the distributor into the position 5, for which position there is produced a change in air distribution in the pipes 11, 18 and 19. Through the pipe 19, the air escapes from the cylinder $O^2$, under the piston $O^1$, which allows the door O of the furnace to descend and stops the burners P. The air admitted through the pipe 18 lifts the piston $Q^1$ in the cylinder $Q^2$, which thrusts the "push-up" tool into the bottom of the bottle. The air admitted into the pipe 11, through a large-sized part of the discontinuous circular groove of the distributor disk, arrives quickly and in large volume behind the piston $C^3$, that is, to the right of this piston, and pushes it rapidly to the left. This movement results in rapidly thrusting the blank molds $D^1$, $D^2$ into the furnace, which is the position shown in Figs. 1 and 2.

When piston $C^3$ arrives at the end of its course to the left, it uncovers the port of the pipe 6 through which air passes and causes the distributor disk $B^1$ to turn through one-tenth of a revolution, bringing it into the position 6; in this position, no change in air distribution is produced, except for the pipe 20. This pipe, which is attached to the blank molds $D^1$, $D^2$, is put in communication with a vacuum reservoir or with a vacuum-producing machine, (not shown) in which a suitable partial vacuum is maintained. Suction is thus produced in each blank mold $D^1$, $D^2$ which, as shown in Fig. 6, fills itself with glass.

At the same time that the air is admitted to the distributor through the pipe 6, it fills the reservoir 24 more or less rapidly, according to the degree of opening of the valve 23. The time during which the glass is sucked up by the blank mold is thus regulated. When the pressure in the reservoir 24 has become sufficiently great, the air passing through the pipe 7 actuates the distributor disk, which returns to the position 7 from which it started, and the operation commences again, passing through the stages described above. The valve 49 serves to stop the machine, if required, during the transfer of the parison.

From the foregoing, it will be seen that various parts of the machine are operated in response to the movement of the blank mold unit toward and away from the gathering station, and, in fact, the movement of the blank mold unit itself is controlled through its own movement. Thus, the application of vacuum to the molds at the gathering station, the supply of air pressure to said molds, the operation of the plungers, the opening of the blank molds and neck molds to transfer the blanks to the finishing molds, the blowing of the blanks in the finishing mold, etc., are, or may be, effected in response to the movement of the blank mold unit. Thus, the proper time relations between the operations of gathering the charges of glass, forming the charges into blanks and blowing the blanks into completed articles in the finishing molds are controlled by the movements of the molds to and from the gathering station, this control being either directly from such movements or indirectly through the distributor as a result of such movements.

As has been mentioned above, the machine is displaced longitudinally after each operation of gathering the glass, by means of the arrangement of pistons $R^3$, $R^4$, connecting rods $R^5$, $R^6$, and the rocking member $R^7$, which acts upon the axle $R^8$ of the wheels $A^3$. This displacement is produced by the distributor disk $B^2$ (see Figs. 3, 4 and 5).

This disk $B^2$ is driven, at a speed which is one-third the speed of the distributor disk $B^1$, through the spur gears $B^7$, $B^8$. By reason of the arrangement of the grooves $b^2$ in this disk $B^2$, a change in air distribution is produced in the pipes 21 and 22 each time that the disk $B^2$ has described an angular rotary movement of 120°, that is, one-third of a revolution, and the disk $B^1$ has made a complete revolution. When the distributor disk $B^2$ is at the position 50 (Fig. 3), that is, with pipe 21 at exhaust and the pipe 22 connected to the intake (this position being that shown in Figs. 3 and 4), the air can escape through the pipe 21, from behind the piston $R^3$, and, on the other hand, acts through the pipe 22 on piston $R^4$. This movement causes the whole machine to move back in order to produce a gathering operation near the door of the furnace.

When distributor disk $B^2$ is in the position 51 (Fig. 3), the two pipes 21 and 22 are connected to the intake. The air acts upon the two pistons $R^3$, $R^4$, which results in advancing the machine and maintaining it in an intermediate position, in order to gather at some distance from the door of the furnace.

When the distributor disk $B^2$ is in the position 52, the pipe 22 is connected to the exhaust and the pipe 21 to the intake. The air escapes through the pipe 22 from behind the piston $R^4$, and acts upon the piston $R^3$, which causes the machine to advance so as to approach as closely as possible to the furnace and to perform a gathering operation at a place well within the furnace.

A similar arrangement (not shown) may be provided to permit gathering at different places transversely of the furnace, by displacing transversely a carriage carrying the longitudinal rails $A^4$ (Fig. 1) on which run the wheels $A^3$.

It is to be understood that the embodiment described and shown has been given only by way of example, and that a great many modifications of detail may be employed, as for example, in the construction of the central distributor. Moreover, the distributor, instead of being operated by compressed air, may be actuated in any other suitable manner, for example, by an electric motor, or a mechanical transmission of some sort. The distributor, instead of controlling all the movements of the machine, may control only a certain number of the mechanisms of the machine, and the others may be operated electrically or by hand. Also, instead of air any other suitable fluid may be used, without departing from the principles of the invention.

Priority under the International Convention for the Protection of Industrial Property of March 20, 1883, is claimed for the present application, by reason of the filing in France on May 1, 1924 of a corresponding application for French Letters Patent, upon which French Patent No. 581,003 was granted on September 17, 1924, to my assignee, the Société d'Etudes et d'Exploitations Verrières.

I claim:

1. Glass-working apparatus comprising fluid pressure actuated means for performing a plurality of glass fabricating operations, a rotary distributor for receiving and distributing fluid pressure to the several fabricating means in predetermined order and time, and fluid pressure means operable in response to predetermined movements of certain of said fabricating means respectively for imparting predetermined intermittent step-by-step rotary movements to said distributor.

2. Glass-working apparatus comprising fluid-pressure actuated means for performing a plurality of glass-fabricating operations, a rotary distributor for receiving and distributing fluid pressure to the several fabricating means in predetermined order and time, an auxiliary rotary distributor, means controlled by said auxiliary distributor for bodily displacing the apparatus, and means for rotating said distributors.

3. Glass-working apparatus comprising a mold, means for filling said mold by suction, and a distributor for connecting said mold with a source of sub-atmospheric pressure at a predetermined time, and fluid-pressure means, also controlled by said distributor, for fabricating the glass so drawn into said mold.

4. In a suction gathering glass forming machine, in combination, a suction fed glass mold, a sliding frame carrying said mold, a carriage for supporting said frame, means for reciprocating said frame to move said mold into and out of a glass furnace and for dipping the mold into contact with the glass, adjustable means for varying the dip of the mold in accordance with variations in the level of the glass in the furnace, and means to bodily move the carriage, between dipping operations, to bring the mold into contact with the glass at different points for different gatherings.

5. In combination, a suction-fed glass mold, a sliding frame carrying said mold, means carried by said frame for adjustably counterbalancing the weight of said mold, means for reciprocating said frame to move said mold into and out of a glass furnace, and for tilting said frame, while said mold is in said furnace, to bring said mold into contact with the glass, and adjustable means for limiting said tilting movement and for thereby suiting the lowered position of said mold to the level of the glass in said furnace.

6. Glass-working apparatus comprising a blank mold, a ring mold and a blow mold associated with said blank mold, means for forming parisons in said blank mold, and transfer means including means for opening said blow mold, means for moving said blank mold and said ring mold laterally and rectilinearly to bring the parison in said blank mold to a position within the cavity of the blow mold when the blow mold is closed, means for then opening said blank mold, leaving the parison suspended from said ring mold, means for closing said blow mold around the parison, and means for then opening said ring mold.

7. Glass-working apparatus comprising a suction-fed blank mold, means for moving said blank mold into and out of a glass furnace to receive and remove charges of molten glass, a ring mold movable with said blank mold, means for forming parisons in said blank mold, a relatively stationary blow mold to which said blank mold approaches when moving away from the furnace, and transfer means including means for opening said blow mold, means for thereafter opening said blank mold, leaving the parison suspended from said ring mold, means for closing said blow mold around the parison in the position of the parison where it was released by the blank mold, and means for then opening said ring mold.

8. Glass-working apparatus comprising a suction-fed mold, mechanism for moving said mold into and out of a furnace to gather charges of glass in said mold, and means operating in timed relation to the movement of said mold for displacing said mechanism bodily in an interval between charging operations to cause said mold to gather charges from horizontally spaced portions of the glass in said furnace.

9. Glass-working apparatus comprising a frame, a slide mounted on said frame, a cylinder and piston connected to move said slide, a suction-fed mold carried by said slide, a finishing mold carried by said frame, fluid-pressure means for fabricating glassware in said molds, and means for controlling the operation of the said fluid-pressure means, said control means including ports in said cylinder adapted to be uncovered by the movement of the piston therein, whereby certain of the said operations take place in automatic response to the movement of said piston.

10. Glass-working apparatus comprising a suction-fed mold, a slide carrying said mold, a stop member carried by said slide, and a roller serving to support said slide and also to engage said stop member and to tilt said slide to depress said mold.

11. Glass-working apparatus comprising a suction-fed mold, a slide carrying said mold, a shear member adapted to sever glass beneath said mold, and means for mounting and operating said shear, comprising a support for said shear, a cylinder having its piston rod connected to move said shear support, a ratchet carried by said support and adapted to be engaged by said mold to retract said shear with said mold, and a roller for supporting said shear support and said shear, the said shear and its support being offset vertically so that when said shear support is retracted past said roller, the said shear descends and rests upon said roller.

12. Glass-working apparatus comprising a pair of finishing molds each having a bottom plate arranged to tilt laterally to discharge ware from the mold in a direction opposite to the other mold, and means for simultaneously tilting said bottom plates, comprising a rock shaft connected to each bottom plate, a lever connected to each rock shaft, a link connecting said levers, and a fluid pressure cylinder having its piston rod connected to said link.

13. Glass-working apparatus comprising a glass furnace for containing a supply of molten glass and having a side opening, means for introducing a suction-fed mold into said furnace through said opening, and for withdrawing said mold from said furnace when the mold is charged, a vertically movable door arranged to close said furnace opening in the intervals between the introduction of molds and to descend for exposing said opening, a burner disposed adjacent to said door and adapted to heat the glass in the area at which gathering takes place, and means for controlling said burner in response to movements of said door to operate only when the door is closed.

14. Apparatus for forming hollow glass articles comprising a container for a pool of molten glass, a blank mold unit adapted to gather charges of glass by suction from the surface of the glass in the pool, a finishing mold in which parisons formed in the blank mold unit are adapted to be blown to final form, means for moving the blank mold unit substantially horizontally between the gathering pool and a transfer station, means to suck a charge of glass into said blank mold unit, means for applying blowing air to the charge of glass in said blank mold to form a parison, means for subsequently opening the blank mold, means to transfer said parison from the blank mold to the finishing mold and for releasing the parison therein, means to blow the parison to final form in the finishing mold, and means for so timing the operations of the several above-recited means that a charge of glass is formed in said blank mold while the preceding charge of glass gathered in said blank mold is being blown to final form in the finishing mold.

15. Apparatus for forming hollow glass articles comprising a blank mold into which charges are adapted to be introduced by suction, means for moving the blank mold horizontally between a gathering station and a transfer station, means to dip the blank mold into a gathering pool at the gathering station to gather a charge in the blank mold by suction, means to shear off the charge thus gathered, means to blow the charge while enclosed by the blank mold to form a parison, a finishing mold, means to transfer the parison from the blank mold in the plane of horizontal movement of the blank mold to the finishing mold, and means to blow the parison to final form in the finishing mold, the blowing of the parison in the finishing mold continuing during the period in which the next succeeding charge of glass is being formed in the blank mold.

16. A glassware forming machine comprising a support for the mechanism of said machine, a blank mold unit mounted for slidable movement on said support, said unit including a blank mold and a neck mold, means to move the said unit on the support rectilinearly between a charge gathering station and a blank transfer station, means controlled by the rectilinear movement of said unit for causing a vacuum to be created in the molds of said unit, and means controlled by the movement of said unit away from the gathering station and operable during such movement to cause the application of air pressure to the charge of glass in the said mold, prior to the arrival thereof at a transfer station.

17. In a glassware forming machine, a frame for supporting the mechanism of said machine, a blank mold unit slidably mounted upon said frame, means to reciprocate the said unit on said frame between a charge gathering station and a blank transfer station, means to apply vacuum to the mold of said unit while the mold is at the gathering station, means actuated in response to the movement of the blank mold unit away from the gathering station and operable during such movement to cause the application of air pressure to the mold, and means to change the timed relation between the application of vacuum and air pressure to the mold.

18. In a glassware forming machine, a frame for supporting the mechanism of said machine, a blank mold unit mounted for reciprocation on said frame, means to move the said unit rectilinearly between a charge gathering station and a blank transfer station, a plunger reciprocable into and out of the cavity of the mold of said unit, means to apply vacuum to the cavity while the plunger is projected thereinto, means to shut off vacuum at a predetermined time following the charge gathering operation, means operating in response to the movement of said unit away from the gathering station for retracting said plunger, means for supplying air pressure to the mold cavity during the movement of the blank mold unit toward the transfer station, and means to change the timed relation between the termination of the application of vacuum and the application of air pressure.

19. In a glassware forming machine, a frame for supporting the mechanism of said machine, a blank mold unit mounted for reciprocation on said frame, means for moving said unit rectilinearly between a charge gathering station and a blank transfer station, a plunger reciprocable into and out of the cavity of the mold of said unit, means to apply vacuum to the cavity while the plunger is projected thereinto at the charge gathering station, means to shut off the vacuum at a predetermined time following the charge gathering operation, a rock arm controlling the movement of the said plunger, and a cam adapted to rock said arm to move the plunger out of the mold cavity.

20. In a glassware forming machine, a frame for supporting the mechanism of said machine, a blank mold unit slidably mounted on said frame, means for reciprocating said unit to move the unit between a charge gathering station and a blank transfer station, said unit including a partible blank mold, mechanism carried by and movable with said unit for opening or closing said blank mold, and means controlled by the movement of said unit to operate the said mechanism to open the blank mold at least by the time said unit arrives at the transfer station.

21. In a glassware forming machine, a frame for supporting the mechanism of said machine, a blank mold unit slidably mounted on said frame, said unit including a partible blank mold, a partible neck mold associated with said blank mold, automatic means to move the said blank mold unit rectilinearly between a charge gathering station and a blank transfer station, a finishing mold mounted on said frame and adapted to close about a blank in the blank forming unit when said unit reaches the end of its rectilinear travel, mechanism carried by said blank forming unit for opening and closing said blank mold, means controlled by the movement of said unit for operating said mechanism to open the blank mold at least by the time said unit arrives at the transfer station to leave the previously formed blank suspended from the neck mold, means for causing the finishing mold to inclose said blank, and means for opening the neck mold following the inclosure of the blank in the finishing mold.

22. In a glassware forming machine, a frame for supporting the mechanism of said machine, a blank mold unit movably supported on said frame, said unit including a partible blank mold, a partible neck mold associated with said blank mold, means for horizontally moving said unit between a charge gathering station and a blank transfer station and for tilting said unit at the charge gathering station, mechanism carried by said blank mold unit and including a single reciprocable member for opening and closing said neck mold, and means carried by said frame adapted to cooperate with said mechanism as a result of the movement of said unit toward the transfer station to open said neck mold upon such movement of said blank mold unit toward the transfer station.

23. In a glassware forming machine, a frame for supporting the mechanism of said machine, a blank mold unit slidably supported on said frame, said unit including a partible blank mold, a partible neck mold associated with said blank mold, mechanism carried by said frame for opening said neck mold, means to reciprocate said blank mold unit rectilinearly between a charge gathering station and a blank transfer station, a finishing mold positioned to close about a blank in the blank mold unit at the end of the reciprocating travel thereof to the transfer station, means controlled by the movement of said blank mold unit toward the transfer station for opening said blank mold to leave the blank suspended from the neck mold, means for causing the finishing mold to inclose the blank suspended from the neck mold, and means positioned for engagement with said neck mold opening mechanism upon the movement of said blank mold unit to the transfer station to open the neck mold after the inclosure of the blank in the finishing mold.

24. In a glassware forming machine, a frame for supporting the mechanism of said machine, a blank mold unit slidably mounted on said frame, means for moving said unit rectilinearly between a charge gathering station and a blank transfer station, said unit being adapted to gather a charge of glass by suction, a partible blank mold forming a part of said unit, a plunger for forming an initial opening in the glass in said mold, means controlled by the movement of said unit toward said transfer station for retracting said plunger, means controlled by the movement of said unit toward said transfer station to open said blank mold, a finishing mold adapted to receive a blank from the blank forming unit at the transfer station, and means for transferring a blank from the blank forming unit to the finishing mold.

25. In a glassware forming machine, a frame for supporting the mechanism of said machine, a blank mold unit slidably mounted on said frame, means for moving said unit rectilinearly between a charge gathering station and a blank transfer station, said unit including a partible blank mold, a partible neck mold associated with said blank mold, means operating in response to the movement of said unit for controlling the application of vacuum to said mold when said mold is at the gathering station, means controlled by the movement of said mold unit away from the gathering station and operable during such movement for supplying pressure to said mold, mechanism for operating said blank mold, means controlled by the movement of said mold unit toward the blank transfer station for operating said mechanism to open the blank mold at least by the time said unit arrives at the transfer station, a finishing mold adapted to receive a blank at the transfer station, means for operating said finishing mold to inclose the blank supported by the neck mold, mechanism carried by the mold unit for operating the neck mold, and means carried by said frame for operating said mechanism to open the neck mold following the inclosure of the blank by the finishing mold.

26. In a glassware forming machine, a frame for supporting the mechanism of said machine, a blank mold unit slidably mounted upon said frame, means to reciprocate the said unit on said frame between a charge gathering station and a blank transfer station, means to apply vacuum to the mold of said unit while the mold is at the gathering said unit while the mold is at the gathering station, a finishing mold adapted to receive a blank from the blank mold unit at the transfer station, automatic means for transferring a blank from the blank mold to the finishing mold, and means operating in response to the movement of said blank mold unit for supplying blowing air to the finishing mold to blow the blank into its final shape in the finishing mold.

27. In a glassware forming machine, a frame for supporting the mechanism of said machine, a blank mold unit slidably mounted on said frame, means to move said unit rectilinearly between a charge gathering station and a blank transfer station, means to apply vacuum to the mold in said unit while the mold is at the gathering station to gather a charge of glass, shearing means operating in timed relation to the movement of said unit away from the gathering station to sever the charge of glass from the body of glass from which it is gathered, and a member carried by said mold unit adapted to operate in response to the movement of said unit toward the transfer station to hold said shearing means in engagement with the bottom of the mold whereby the charge of glass in said mold is supported during such movement.

28. In a glassware forming machine, a frame for supporting the mechanism of said machine, a blank mold unit slidably mounted upon said frame, means to move said unit rectilinearly between a charge gathering station and a blank transfer station, means to apply vacuum to the mold of said unit while the mold is at the gathering station to gather a charge of glass, shearing means operating in timed relation to the movement of said unit away from the gathering station to sever a charge from the body of glass from which it is gathered, means connected to said unit and movable therewith to hold said shearing mechanism in engagement with the bottom of the mold of said unit to support the charge of glass in said mold for the desired period during the movement of said unit away from said gathering station, and means rendering said last-named means inoperative to prevent interference on the part of the shearing means with the movement of the said mold unit toward the gathering station.

29. In a glassware forming machine, a frame for supporting the mechanism of said machine, a blank mold unit slidably mounted upon said frame, means to move said unit rectilinearly between a charge gathering station and a blank transfer station, means to apply vacuum to the mold of said unit while the mold is at the gathering position to gather a charge of glass, shearing means operating in timed relation to the movements of said unit away from the gathering station to sever the charge of glass from the body of glass from which it is gathered, means for causing said shearing mechanism to be held in engagement with the bottom of the mold of said unit to support the charge of glass therein for the desired period, means operating in timed relation to the movement of said unit away from the gathering station and prior to the arrival thereof at the transfer station for admitting air into the mold of said unit prior to the opening thereof to form a parison, and means for subsequently opening the mold to expose the parison at the transfer station.

30. The method of forming hollow glassware which comprises simultaneously moving a plurality of blank forming units between a gathering station and a blank transfer station, charging all of said units simultaneously by suction at the gathering station, withdrawing said units together from the gathering station, shearing the charges of glass simultaneously from the glass in the pool from which they are gathered, supporting the charges of glass in the mold units from beneath for a predetermined period of time, admitting air pressure simultaneously into the mold units to form the charges of glass into blanks, simultaneously opening the blank molds to leave the blanks suspended from the neck molds, moving said neck molds and blanks laterally of the gathering pool toward a plurality of open finishing molds at the transfer station, closing said finishing molds about the blanks, opening the neck molds simultaneously, and simultaneously shaping the blanks into finished articles in the finishing molds, while gathering additional charges of glass for parisons in said blank forming units.

31. The method of forming hollow glassware which comprises simultaneously moving a plurality of blank forming units between a gathering pool and a blank transfer station, charging said mold units simultaneously by suction at the gathering station, withdrawing said units together from the gathering station, shearing the charges of glass simultaneously from the glass in the gathering pool, holding the shears in engagement with the bottoms of the mold units to support the charges of glass in said units for the desired period, admitting air pressure simultaneously into the mold units to form the charges of glass into blanks, opening the blank molds of the units simultaneously to leave the blanks suspended from the neck molds of said units, moving said neck molds and blanks laterally of the gathering pool toward a plurality of opened finishing molds at the transfer station, closing the finishing molds simultaneously about the blanks, opening the neck molds simultaneously to release the blanks, and simultaneously shaping the blanks in the finishing molds into completed articles, while gathering additional charges for parisons in the blank forming units.

32. A glass working machine comprising a carriage, a parison mold mounted thereon and adapted to be projected within a glass furnace to gather a charge of molten glass by suction from a glass bath therein, pneumatic means for determining the interval of time said mold remains in contact with said bath in said furnace, and a valve associated with said pneumatic means for varying said time interval.

33. Apparatus for forming glassware comprising a parison forming unit including a blank mold and a neck mold, means for moving said unit substantially horizontally into and out of a position for contact with the surface of a pool of molten glass, means for charging said molds with glass by suction, a plunger permanently associated and movable with the neck mold, and operating when depressed to form an initial blowing cavity in the gathered charge of glass, means for retracting said plunger from said cavity while said unit is being moved away from the gathering position, means for introducing preliminary blowing air through the neck mold and into the cavity in the glass to complete the formation of a parison in neck-up position in the blank mold and neck mold, means for moving the parison forming unit including both the molds thereof substantially horizontally toward a transfer zone, means for opening the blank mold whereby the parison is suspended by the neck mold in the transfer zone, a finishing mold adapted to close about the suspended parison while the parison is held in the path of horizontal movement of said unit, means for closing the finishing mold about the suspended parison, means for opening the neck mold to release the parison in the finishing mold, means for thereafter blowing the parison to final shape in the finishing mold, and means for timing the operation of the blank forming unit to gather another charge of glass for a parison, while the first parison is being blown to final shape in the finishing mold.

34. A glass working machine comprising a carriage, a parison mold mounted thereon and adapted to be projected within a glass furnace to gather a charge of molten glass by suction from a glass bath therein, pneumatic means for determining the interval of time said mold remains in contact with said bath in said furnace, including a pneumatic cylinder in which pressure starts to build up as soon as said mold is moved into contact with the molten glass of said bath and arranged to withdraw said mold out of contact with said glass when the pressure in said cylinder reaches a predetermined point, and means to limit the building up of pressure in said cylinder to determine said time interval.

Signed at Paris, France, this 9th day of April, 1925.

PIERRE ARBEIT.